United States Patent [19]

Tang

[11] Patent Number: 5,649,172
[45] Date of Patent: Jul. 15, 1997

[54] COLOR MIXING DEVICE USING A HIGH SPEED IMAGE REGISTER

[75] Inventor: Alex Tang, Hsin-Chu, Taiwan

[73] Assignee: United Microelectronics Corp., Hsinchu, Taiwan

[21] Appl. No.: 430,647

[22] Filed: Apr. 28, 1995

[51] Int. Cl.[6] .................................................. G06T 1/60
[52] U.S. Cl. .......................... 395/508; 395/513; 395/515
[58] Field of Search ....................................... 395/164, 166, 395/162, 508, 513, 514, 518, 515; 345/150, 153, 155

[56] References Cited

U.S. PATENT DOCUMENTS

| | | | |
|---|---|---|---|
| 4,893,114 | 1/1990 | Ishii | 395/163 |
| 4,924,432 | 5/1990 | Asai et al. | 395/166 |
| 5,036,475 | 7/1991 | Ueda | 395/164 |
| 5,170,445 | 12/1992 | Nelson et al. | 395/161 |
| 5,179,639 | 1/1993 | Taaffe | 395/164 |
| 5,293,483 | 3/1994 | Mizoba et al. | 395/164 |

*Primary Examiner*—Kee M. Tung
*Assistant Examiner*—Cao Nguyen
*Attorney, Agent, or Firm*—Barnes, Kisselle, Raisch, Choate, Whittemore & Hulbert, P.C.

[57] ABSTRACT

An image register for a graphics display includes a pair of static random access memory (SRAM) devices for respectively storing image data associated with even numbered and odd numbered pixels, which correspond to even numbered and odd numbered addresses. The register includes a counter presettable to an initial value corresponding to a starting address of the stored image data. A half adder is coupled to the counter for addressing the SRAMs according to an even and odd state. Two NAND gates responsive to the least significant bit of the counter control the two SRAMs for simultaneously writing image data having a modified color code portion into the even SRAM and reading stored image data from the odd SRAM during an even state, and for simultaneously reading stored image data from the even SRAM and writing the modified color code into the odd SRAM during an odd state. The register includes a pair of full adders to mix an incoming color code with the stored color code to obtain the modified color code. The simultaneous access to consecutive pixels enables parallel processing to occur, thus improving execution speed.

11 Claims, 4 Drawing Sheets

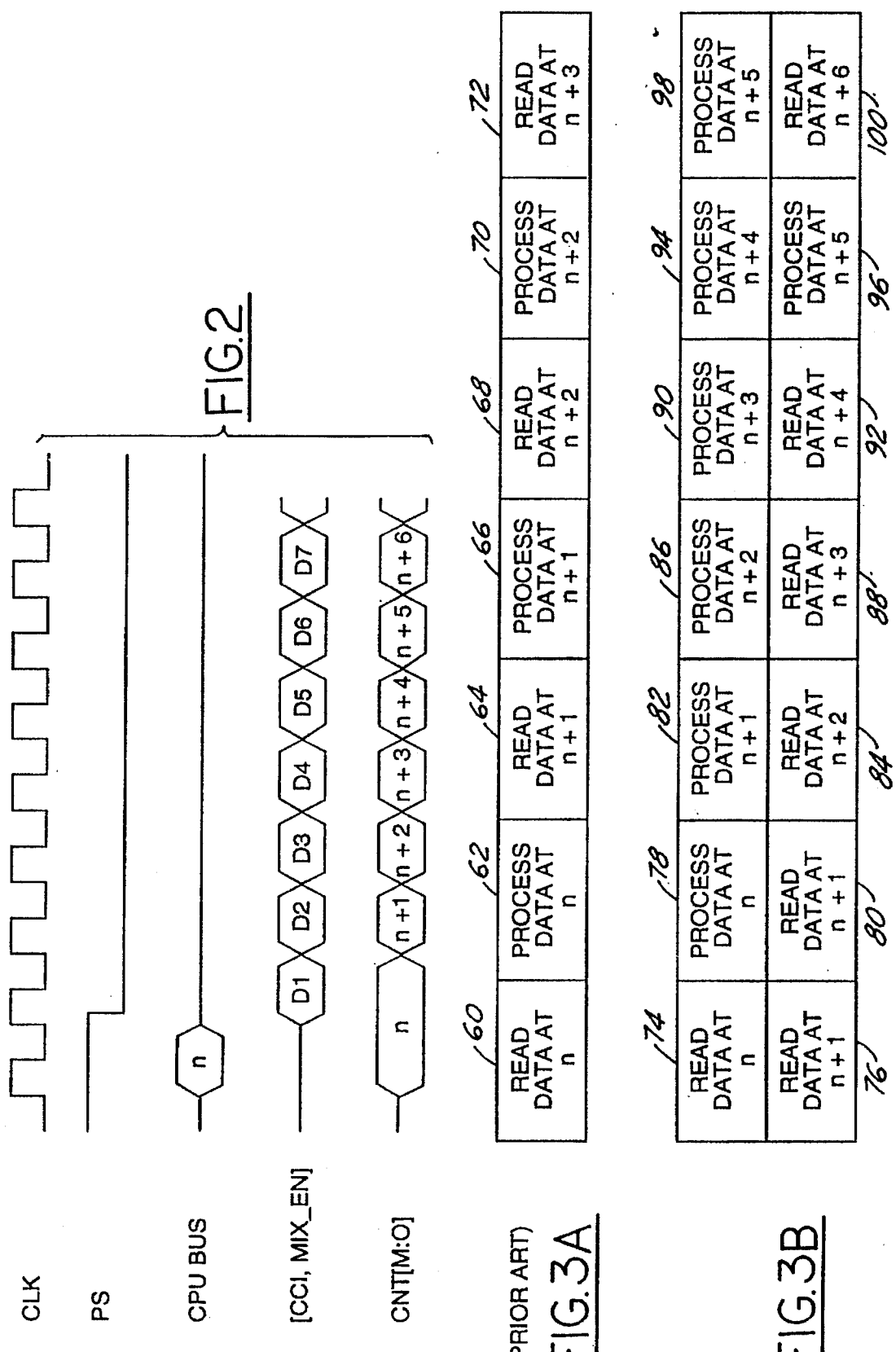

TRUTH TABLE

| A | B | CI | S | CO |
|---|---|---|---|---|
| 0 | 0 | 0 | 0 | 0 |
| 0 | 0 | 1 | 1 | 0 |
| 1 | 0 | 0 | 1 | 0 |
| 1 | 0 | 1 | 0 | 1 |
| 0 | 1 | 0 | 1 | 0 |
| 0 | 1 | 1 | 0 | 1 |
| 1 | 1 | 0 | 0 | 1 |
| 1 | 1 | 1 | 1 | 1 |

COLOR MIXING DEVICE USING A HIGH SPEED IMAGE REGISTER

FIELD OF THE INVENTION

The present invention relates generally to a color mixing device for a graphics display system, and more particularly, relates to a color mixing device for a graphics display system using a high speed image register.

BACKGROUND OF THE INVENTION

In a conventional graphics display system, an image register is often provided for the processing of information associated with the displayed image, particularly information associated with each pixel of the image. In particular, a color code may be associated with each pixel (i.e., each pixel in a graphics image may have a plurality of colors). Further, a common processing task assigned to such image registers is that of "mixing" colors associated with a particular pixel in order to produce an image, for example, when mixing layers of an image. Thus, when modifying an image on a graphics display through the above-mentioned color "mixing" function, a system for controlling the displayed image must ensure that the data stored in a memory associated with the image register is modified only in accordance with a predefined color mixing function.

This modification process conventionally requires two steps per pixel: a first step to read the image data, particularly the color code, from the image register memory, and a second step to process this retrieved image data in accordance with the predefined color mixing function, and writing the processed image data, including the modified color code, into the image register memory. Conventionally, the predefined function entails addition of the pre-existing color code and the color code to which it is to be mixed. As can be appreciated, the conventional graphics arrangement requires a complicated two-step process for each image pixel, including a "wait" state for retrieving the stored image data prior to mixing. The sequential method of processing employed in conventional color mixing image registers limits the execution speed, and accordingly, limits the speed at which the system can display a modified "color mixed" graphics image.

It is therefore an object of the present invention to provide an image register for use in a color mixing device that minimizes or eliminates the shortcomings of the prior art image registers.

It is another object of the present invention to provide a color mixing device by using a high speed image register.

It is a further object of the present invention to provide a color mixing device by using a high speed image register that can improve significantly the execution speed of the color mixing process.

It is another object of the present invention to provide a color mixing device by using a high speed image register that utilizes two individual static random access memory (SRAM) devices for storing image data.

It is still another object of the present invention to provide a color mixing device by using a high speed image register that can simultaneously color mix image data corresponding to address n while reading image data corresponding to address n+1 in advance of its need for mixing such that the stored image data associated with address n+1 is immediately available for processing in a next subsequent cycle to thereby eliminate a "wait" state during the color mixing calculation.

SUMMARY OF THE INVENTION

In accordance with the present invention, an improved color mixing device is provided by using a high speed image register that has substantially improved execution speed in color mixing. This invention generally provides an image register for processing image data associated with a range of addresses including even addresses and odd addresses wherein the image data includes a color code portion indicative of the displayed color of the pixel. The image register in accordance with this invention includes a first memory means for storing image data associated with the even addresses, a second memory means for storing image data associated with the odd addresses, an address means for addressing the first and second memory means in accordance with an even state and an odd state, and a processing means coupled to the first and second memory means. The splitting of the image data between two individual memory means allows the processing means to operate on image data contained in both memory means in parallel, thus providing improved execution speed. The even state exists when the processing means is processing image data associated with even addresses; the odd state exists when the processing means is processing image data associated with odd addresses.

The processing means is provided for simultaneously writing image data having a modified color code portion into the first memory means and reading stored image data from the second memory means during the even state. The processing means also performs the function of simultaneously reading stored image data from the first memory means and writing image data having the modified color code portion into the second memory means during the odd state. The processing means also is provided for performing the color mixing function; that is, for selectively summing, in response to a mix enable signal, the color code portion of input image data and the color code portion of stored image data to define the image data having the modified color code portion.

The inventive image register thus operates on the image data associated with consecutive even and odd addresses (i.e., stored in the two memory means) in parallel to thereby improve the processing speed by eliminating the "wait" state required by conventional image registers, since during any cycle, the current color code associated with the pixel being processed has already been retrieved and buffered during the prior cycle, and is therefore immediately available for processing (i.e., addition with the incoming color code to thereby "mix" the colors).

In a preferred embodiment, the first and second memory means each comprise a static random access memory (SRAM) device for storing image data, including particularly a color code. The address means comprises a counter having a presettable initial value whose output is used for producing an address for each of the two SRAMs. A high-order portion of the counter output is used for addressing the second SRAM (i.e., odd SRAM). The address means further includes an adder coupled to the counter output for calculating an address for the first SEAM (i.e., even SRAM).

The processing means of the preferred embodiment comprises first and second control gates each responsive to the least significant bit of the counter output for respectively enabling the even and odd SRAMs to be read from and written into during even and odd states of the register. The processing means further includes first and second buffers constructed from D-type flip-flops for receiving and temporarily retaining stored image data from the SRAMs, particularly the color code portion of the image data. The output of the first and second buffers are respectively connected to first and second transmission gates, which are controlled by the mix enable signal, for selectively passing the buffered color code. The first and second transmission gates are respectively connected to first and second summing means, preferably constructed from full adder devices. Each adder has a pair of inputs, one of which is connected to the input color code, while the other input of each is respectively connected to the first and second transmission gates. The full adders are provided for generating image data having the modified color code.

It should be appreciated that the benefit of an image register in accordance with the present invention is realized by the use of two SRAM devices such that even number and odd number pixels of the image display (which are stored in corresponding even and odd addresses, respectively) can be processed separately (i.e., in parallel) to eliminate the prior art "wait" state to improve the speed of processing. Particularly, the inventive image register eliminates the read/write contention by processing the image data (i.e., "color" mixing and writing the modified color code) at address n while reading from a separate memory device, image data corresponding to address n+1 so that an input stream of image data to the image register may be continuously received since the color mixing calculation can be completed without delay and immediately written into the image register memory.

These and other features and objects of this invention will become apparent to one skilled in the art from the following detailed description and the accompanying drawings illustrating features of this invention by way of example.

BRIEF DESCRIPTION OF THE DRAWINGS

FIG. 2 is a partial timing sequence chart for the image register embodiment of FIG. 1 showing various input signals.

FIG. 3A is a simplified function sequence chart depicting the relative processing progress of a prior art image register for use in a color mixing device.

FIG. 3B is a simplified function sequence chart of the image register embodiment of FIG. 1 showing the accelerated progress, relative to prior art image registers, in implementing a color mixing function.

DETAILED DESCRIPTION OF THE PREFERRED EMBODIMENT

The present invention provides an improved color mixing device by using a high-speed image register to save the read/write time required to perform the color mix, and to increase the throughput of image data processed by the image register.

Figure 1:
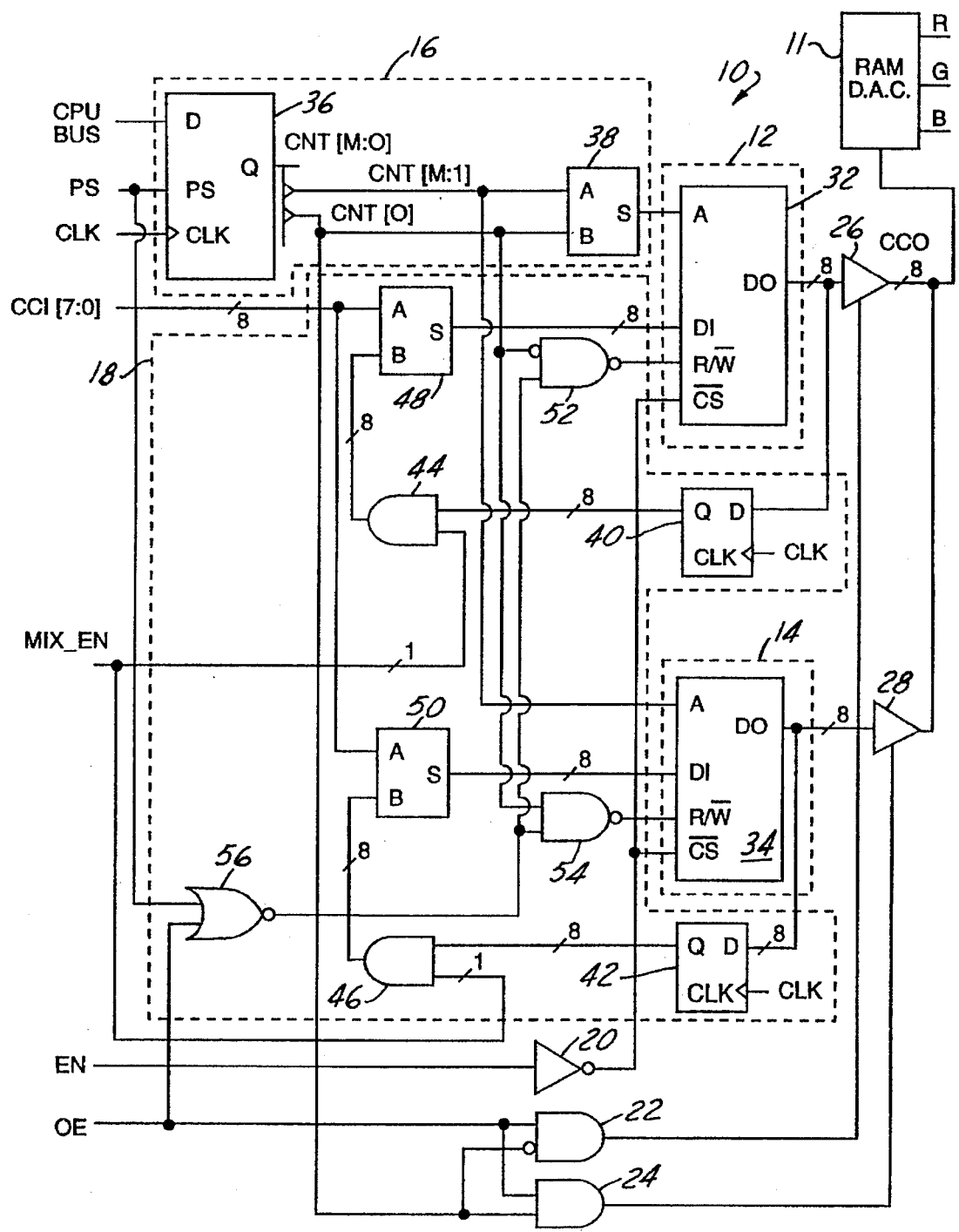
FIG. 1 is a partial circuit diagram view of an image register embodiment of the present invention utilizing two SRAM devices to implement a parallel processing architecture for use in a color mixing device.

FIG. 1 shows an image register 10 for use in a graphics display system for processing image data, particularly for use in a color mixing device for mixing colors associated with a pixel of the display. It should be appreciated that the described embodiment may be adapted for use in other environments and still remain within the spirit and scope of the present invention. Before proceeding to a detailed description of image register 10, a description of the overall processing established by register 10 will be set forth.

Referring to FIG. 1, image register 10 is adapted for receiving image data as an input (as a stream of image data—pixel data) wherein each image data segment associated with the pixel includes a color code input [CCI]. Image register 10 processes these incoming pixels and provides a corresponding color code output [CC0] for each processed pixel stored in memory. The color code associated with the pixel being processed is used to define the displayed color of the pixel. Color mixing is a desirable function in a graphics display system, and is customarily implemented by adding to the current color code of the pixel being processed a second color code associated with incoming image data. For the illustrative embodiment shown in FIG. 1, the color mixing function may be selected or deselected by the use of a mix enable signal MIX-EN. The image register operates in accordance with this mix enable signal as follows. When the mix enable signal MIX-EN is a logic 1, the incoming color code [CCI] is "mixed" with the color code stored in the image register memory corresponding to the pixel being processed. The image register 10 then overwrites the original color code in image memory with the modified color code obtained from the color mixing process. If the mix enable signal MIX-EN is a logic 0, the incoming color code [CCI] associated with the pixel being processed is written into the image register memory, overwriting and thus destroying the color code initially stored therein. Output image data [CC0] may be, for example, sent to a Random Access Memory (RAM) based Digital-to-Analog Converter (DAC) 11 to provide a respective Red (R), Green (G), or Blue (B) analog output to a video display monitor (not shown). D.A.C. 11 is a commercially available component, and may be, for example, a UM70C188 available from United Microelectronics Corp., assignee of the present invention.

As mentioned above, image data is provided as an input to image register 10 for each address in a range of addresses to which the image data is associated, which includes even addresses and odd addresses, which, in tun, correspond to even numbered and odd numbered pixels. This range of addresses is related to and corresponds to screen coordinates of a graphics display.

As shown in FIG. 1, image register 10 includes first memory means 12 for storing image data associated with even addresses (i.e., even numbered pixels), second memory means 14 for storing image data associated with odd addresses (i.e., odd numbered pixels), address means 16 for addressing first and second memory means 12 and 14 according to an even state and an odd state, and a processing means 18 coupled to memory means 12 and 14. The even state exists when processing means is processing (i.e., "mixing" color and writing the result into memory) image data associated with even addresses; the odd state exists when the processing means is processing image data associated with odd addresses.

Image register 10 further includes an inverter gate 20 coupled to a positive-logic enable signal EN. The enable signal EN, when present, activates first and second memory means 12 and 14 for read and write operations.

Image register 10 may further include a pair of two-input AND gates 22 and 24 having one of their respective inputs connected to a positive-logic output enable signal OE. When the output enable signal is high, one of first and second output multiplexers 26 and 28 is selected, based on an even/odd select signal, CNT [0], generated by address means 16, to pass image data (including a modified color code) from first and second memory means 12 and 14 to the output CC0 of image register 10.

First memory means 12 preferably takes the form of a static random access memory (SRAM) 32 which includes a control input, R/$\overline{W}$, for controlling storage of image data into SRAM 32, as well as controlling retrieval of addressed image data stored therein. SRAM 32 is a commercially available device, such as, for example, a UM611024, available from United Microelectronics Corp., assignee of the present invention. SRAM 32 further includes an address input A, coupled to an output generated by address means 16, for selecting an address within SRAM 32, a data input DI, a negative-logic chip select input, $\overline{CS}$, coupled to an inverted version of the enable signal EN and a data output, D0, coupled to first output multiplexer 26.

Second memory means 14 is also preferably an SRAM device 34, also having a control input R/$\overline{W}$, for controlling storage of image data on its data input DI lines, and for controlling retrieval of addressed image data stored therein on its data output D0 lines. SRAM 34 is identical to SRAM 32. In an alternate embodiment of this invention, first and second memory means 12 and 14 may comprise a latch-type memory device (not illustrated), or a D-type flip-flop (DFF) type device (not illustrated).

As shown in FIG. 1, address means 16 includes an address generator 36, preferably a presettable counter, and a half adder 38. Counter 36 may be preset to an initial value, using its multi-bit D input, and which is preferably determined by a system CPU and is provided as an input on a CPU bus. The initial value for counter 36 corresponds to a starting address of the image data being processed by image register 10. This initial value is set by asserting a preset control signal, PS, which is coupled to counter 36. Counter 36 has an output, CNT [M:0], which is incremented in accordance with an input clock signal CLK. The least significant bit (LSB) of counter 36 output, CNT [0], defines the even/odd select signal, which in turn determines whether CNT [M:0] (i.e., the pixel address) is an even number or an odd number, which then defines the even state and odd state of image register 10. Half adder 38 is provided for calculating an address for SRAM 32 in accordance with the even state and odd state.

With continued reference to FIG. 1, processing means 18 is provided in image register 10 for simultaneously writing, during the even state, image data having a modified color code portion into SRAM 32, and, reading, during the even state, stored image data from SRAM 34. Processing means 18 further performs the function of simultaneously reading, during the odd state, stored image data from SRAM 32 and writing, during the odd state, image data having the modified color code portion into SRAM 34. Moreover, processing means 18 also performs the function of selectively summing in response to the mix enable signal, MIX-EN, the color code portion of the input image data [CCI] and the color code portion of the stored image data, [CC0], to define image data having the modified color code portion. Significantly, and as will become apparent below, the above-referenced simultaneous read and write operations to the SRAMs 32 and 34 relate to consecutive even and odd pixel image data; thus, while a write operation occurs that relates to image data associated with an address n, a simultaneous read operation occurs to retrieve image data associated with address n+1. This "prefetch" operation eliminates the above-mentioned "wait" cycle and the accompanying processing speed penalties found in conventional color mixing devices.

As shown in FIG. 1, processing means 18 includes a first buffer 40, preferably a D-type flip-flop (DFF), a second buffer 42, also preferably a DFF, a first transmission gate 44, a second transmission gate 46, first summing means 48, which is preferably a full adder device 48, a second summing means 50, which is also preferably a full adder device 50, a first control gate 52, which is preferably constructed using a NAND gate, a second control gate 54, which is also preferably constructed using a NAND gate, and a preset gate 56, preferably constructed using a two-input NOR gate.

DFFs 40 and 42 are provided for receiving and temporarily retaining stored image data respectively read from SRAMs 32 and 34. To provide parallel processing paths for both the even and odd pixels, SRAM 32 (even) has its data output, D0, connected to an input of DFF 40. In the preferred embodiment, only the color code portion of the stored image data, CC0, is coupled to DFF 40. Preferably, CC0 is an eight-bit quantity CC0 [7:0]. In a similar arrangement for the odd pixels, SRAM 34 has its data output, D0, coupled to DFF 42. DFFs 40 and 42 may be 8-bit devices such that an 8-bit color code appears on respective outputs Q of DFFs 40 and 42.

Figure 4:
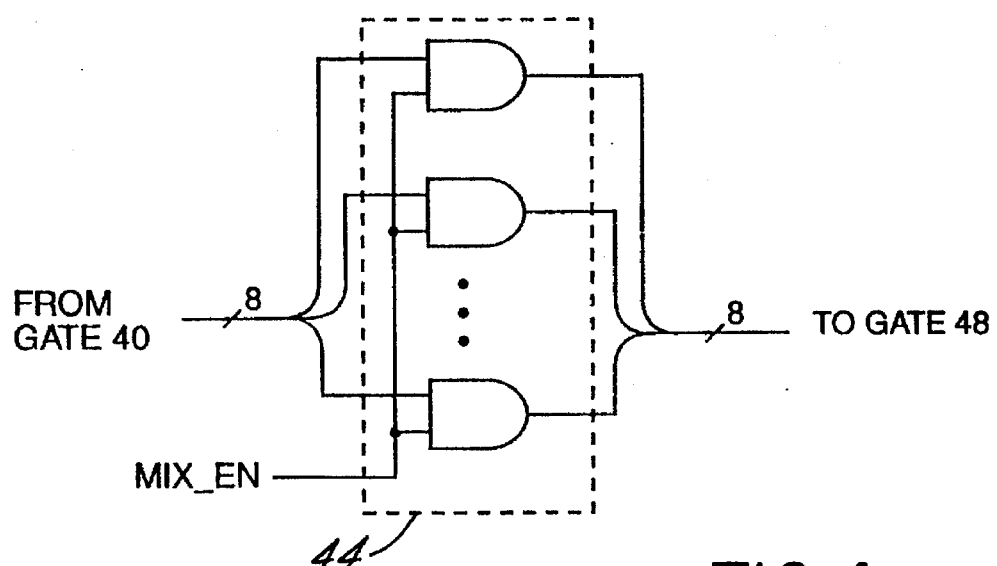
FIG. 4 is a simplified schematic diagram of a transmission gate employed in the image register embodiment of FIG. 1.

Transmission gates 44 and 46 are provided in image register 10 for selectively passing the color code portion, CC0, of the stored image data to full adders 48 and 50. Gates 44 and 46 are commercially available components, and/or may be constructed from commercially-available components. For examples FIG. 4 shows a preferred embodiment for gate 44 constructed using simple two-input AND gates controlled by MIX-EN signal, as described below. It should be understood that gate 46 is preferably of an identical construction.

The mix enable signal, MIX-EN, comprises a single bit, and is provided as an input to both gates 44 and 46. It should be understood that gates 44 and 46 operate as a transmission gate responsive to the mix enable signal, rather than in a strict conjunctive-logic mode. Thus, when the mix enable signal is a logic 1, all of the 8-bits of the color code appearing at the other input of gates 44 and 46 are passed unaltered to full adders 48 and 50, respectively, without regard to the composition of that 8-bit color code. Alternatively, when the mix enable signal is a logic 0, an 8-bit zero, [00000000], is provided to full adders 48 and 50, respectively.

Full adders 48 and 50 are provided for carrying out the color mixing function in accordance with the mix enable signal MIX-EN. Adders 48 and 50 are well known in the art and are commercially available components.

Figure 5A:
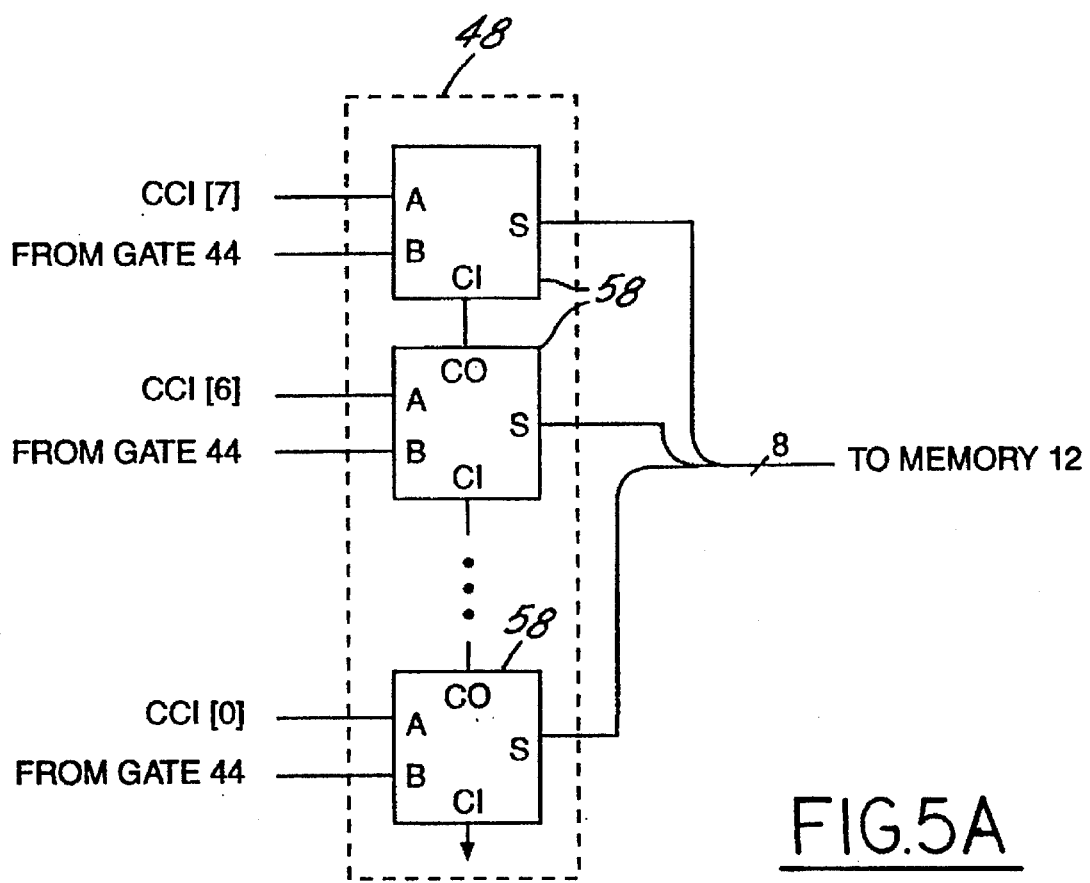
FIG. 5A is a simplified schematic and block diagram view of an 8-bit full adder device employed in the preferred embodiment of the present invention shown in FIG. 1.

Referring to FIG. 5A, full adder 48 is shown in greater detail, and includes, in the preferred embodiment of the present invention, eight single-bit adders 58. Full adder 50 is preferably of identical construction. Single-bit adder 58 includes inputs A, and B, a carry input terminal CI, a carry output terminal C0, and a sum output S. The carry input CI of the low-order adder 58 is tied to a logic 0 (i.e., grounded), while the carry out C0 of the low-order adder 58 is coupled to the carry input CI of the next significant position adder 58, and so on through the most significant bit position, as illustrated in FIG. 5A.

Figures 5B, 5C:
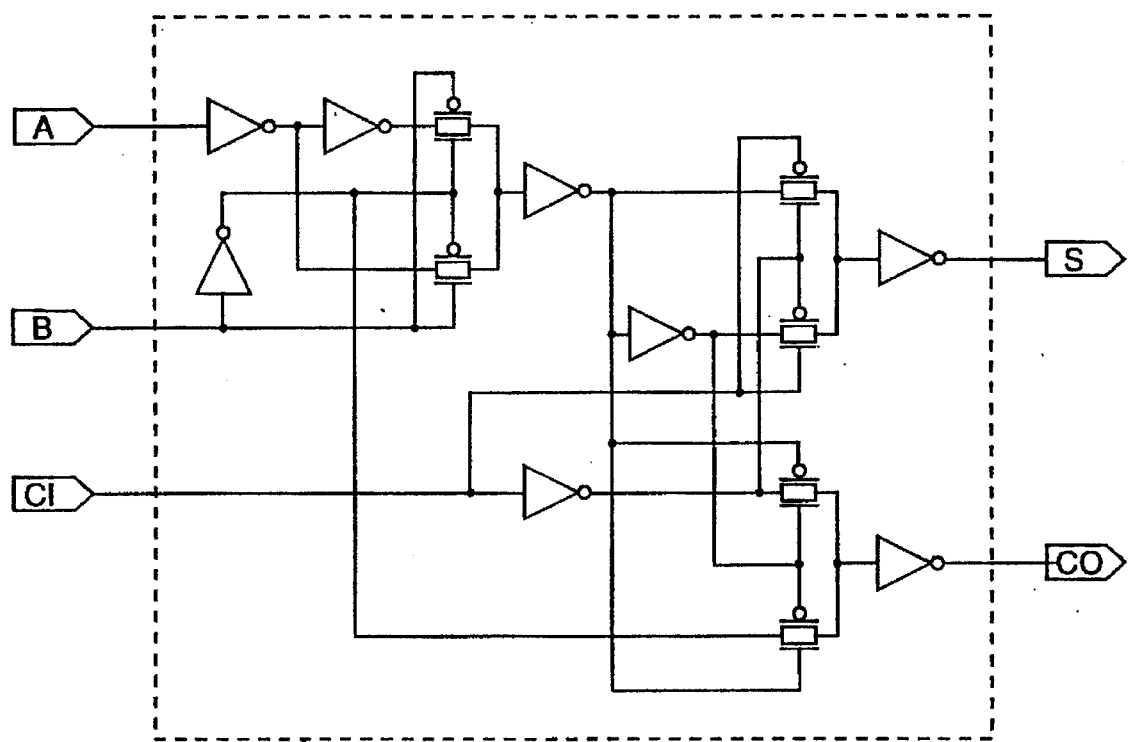
FIG. 5B is a simplified schematic diagram view of an exemplary individual full adder device employed in the 8-bit full adder device shown in FIG. 5A.
FIG. 5C is a truth table diagram illustrating the operation of the single-bit full adder device shown in FIG. 5B for various input values.

Referring to FIG. 5B, a detailed schematic diagram of each adder 58 is depicted. FIG. 5C shows the truth table corresponding to the circuit shown in FIG. 5B.

Referring to FIG. 1, it should be appreciated that when the mix enable MIX-EN, is a logic 1, the output S of full adders 48 and 50 is the sum of the input color code, CCI, and a respective one of the output color codes CC0, that are currently latched in respective DFFs 40 and 42, and transmitted via respective transmission gates 44 and 46. However, when the mix enable signal MIX-EN is a logic 0, operand B of each full adder 48 and 50, as is shown in FIG. 1, is a zero [00000000]. Accordingly, the output of full adders 48 and 50 is merely equal to the operand on input A; namely, [CCI].

NAND gates 52 and 54 are provided for enabling SRAMs 32 and 34 to be respectively read by DFFs 40, 42, and respectively written into by full adders 48, 50. Gates 52 and 54 accomplish this function by generating control signals to control the R/$\overline{W}$ inputs of SRAMs 32 and 34, respectively. NAND gates 52 and 54 are both coupled to the even/odd select signal, CNT [0], although NAND gate 52 is coupled by way of an inverted input. It should be appreciated that when the output of counter 36, CNT [M:0], is even, gate 52 will always control SRAM 32 for a write operation, while gate 54 will control SRAM 34 for a read or retrieval operation; similarly, when the output of counter 36, CNT [M:0], is odd, gate 52 will control SRAM 32 for a read or retrieval operation, while gate 54 will control SRAM 34 for a write operation. Table 1 depicts an exemplary range of addresses generated by counter 36, and the corresponding addresses generated for SRAMs 32 and 34. The logic generated by gates 52 and 54 that are applied to the R/$\overline{W}$ inputs of SRAMs 32 and 34, respectively, are also provided in Table 1 for purposes of illustration only.

TABLE 1

| Counter 36 Output | | SRAM 32 Address | SRAM 34 Address | SRAM 32 R/$\overline{W}$ | SRAM 34 R/$\overline{W}$ |
|---|---|---|---|---|---|
| [M:1] | [0] | | | | |
| 0 0 | 0 | 00 | 00 | 0 | 1 |
| 0 0 | 1 | 01 | 00 | 1 | 0 |
| 0 1 | 0 | 01 | 01 | 0 | 1 |
| 0 1 | 1 | 10 | 01 | 1 | 0 |
| 1 0 | 0 | 10 | 10 | 0 | 1 |
| 1 0 | 1 | 11 | 10 | 1 | 0 |
| 1 1 | 0 | 11 | 11 | 0 | 1 |
| 1 1 | 1 | 100 | 11 | 1 | 0 |

NOR gate 56 is provided for presetting the initial values for DFFs 40 and 42. When the preset control signal PS is asserted, gate 56 will generate a signal which causes NAND gates 52 and 54 to place SRAMs 32 and 34 in a read mode. Since counter 36 output, CNT [M:0], is also being preset during assertion of the PS signal, both SRAMs 32 and 34 are properly addressed, through address means 16, to provide initial color code values via outputs D0, which are then latched into DFFs 40 and 42 for subsequent processing.

Image register 10 is thus characterized by the fact that the SRAMs 32 and 34 for storing image data are divided into two parts, one representing the odd number addresses and the other representing the even number addresses of the image register, (i.e., the odd numbered pixels and the even numbered pixels). By dividing the storage of the image into multiple parts, parallel processing may be accomplished.

With continued reference to FIG. 1, the operation of image register 10 will now be described. The starting address for the image data is first preset into counter 36 by assertion of the preset control signal, PS, and the presentation on the CPU bus of the input starting address, n, which may take the form of a multi-bit number [M:0]. The output from counter 36 is an address representing the corresponding screen coordinate. Assertion of the preset control signal, PS also functions to load DFFs 40 and 42 with initial values, as described above. Also, for purposes of the following description, assume that the output enable signal 0E is low, and that the enable signal EN is high. The counter 36 output, CNT [M:0], may be either an even number address or an odd number address. The LSB of counter 36 output CNT [0] determines whether the counter 36 output represents an even number address or an odd number address (i.e., whether the register 10 is in an "even" state or "odd" state). When signal CNT [0] is "0" it indicates an even number address, while CNT [0] equals "1" indicates an odd number address. The following description assumes that address n is even; however, this is not necessary and the preset phase, described above, loads both DFFs 40 and 42, such that register 10 operates properly irrespective of whether n is even.

Assume n is even. In the even state, gate 52 controls SRAM 32 for a write operation, while gate 54 controls SRAM 34 for a read operation. Moreover, since CNT 0=[0], the same address is applied to both SRAMs 32 and 34. Since each SRAM 32 and 34 has its own address space, consecutive even numbered and odd numbered pixels are respectively stored in SRAMs 32 and 34 at the same SRAM address, A. It should be appreciated, however, that the write operation occurring in SRAM 32 relates to screen or image register address n, while the read occurring simultaneously from SRAM 34 relates to screen or image register address n+1. When the mix enable signal, MIX-EN, is high, adder 48 will perform the color mixing, as described above, and write the modified color code into SRAM 32; however, when the mix enable signal, MIX-EN, is low, adder 48 will merely pass the input color code, [CCI], to SRAM 32 for storage therein. It should appreciated that DFF 40 contains a correct color code value due to the preset procedure described above. Simultaneously, during the even state, the color code value for screen or image register address n+1 is latched by DFF 42, whose output is immediately available during a next subsequent cycle for mixing by way of adder 50.

As counter 36 is incremented, a new processing cycle is begun wherein CNT[0]=1, the "odd" state. In the odd state, gate 52 places SRAM 32 in a read mode, while gate 54 places SRAM 34 in a write mode. Since CNT [0]="1", half adder 38 advances the address supplied to SRAM 32, relative to the address supplied to SRAM 34. Thus, the new address supplied to SRAM 32 points to screen address n+2, while the address supplied to SRAM 34, corresponds to screen address n+1 (assuming the initial conditions and sequence of events described above). Full adder 50 already has at its disposal all the necessary operands to provide a modified color code to SRAM 34: CCI is immediately available, as is the color code [CC0] of the stored image pixel data from SRAM 34, latched in DFF 42 from the prior cycle (i.e., either the above-described "even" state, or had the initial address n been "odd", then, by way of the preset procedure, also described above). Simultaneously, the color code for the screen address corresponding to n+2 is being read from SRAM 34 and latched in DFF 40, for color mixing during a next subsequent processing cycle.

FIG. 2 is a timing sequence chart for various input signals of image register 10. It should be appreciated that when the preset control signal PS is high, the starting address n having bits [M:0], on the CPU bus, is written into counter 36, which outputs starting address n. Note that while PS is high, rising edges of CLK do not advance the output of counter 36.

Further note that during a first period of input clock cycle CLK, while image register 10 is processing image data for starting address n, the input data D1 is mixed in accordance with the mix enable signal and written into one of SRAMs 32, or 34. During this first clock period, the image data associated with address n+1 is read and stored into one of DFFs 40 and 42. During a next subsequent clock period, the color code associated with address n+1, which was retrieved and stored in the prior cycle, is processed (i.e., color mixed) in accordance with the input image data D2 [CCI, MIX-EN].

FIGS. 3A and 3B illustrate the advantages of the present invention as compared to prior art image registers. Referring now to FIG. 3A, a function sequence chart depicting the progress of image data processing, particularly, color mixing, in a prior art device is shown. A conventional prior art image register processes pixel data sequentially. Accordingly, in step 60, a prior art image register must read and latch the existing image data, particularly the color code, associated with starting address n (the so-called "wait" state). In step 62, the prior art image register then processes the retrieved color code (i.e., color mixes with the input color code). Steps 64, 66, 68, 70, and 72 further illustrate the two-step sequence required to color mix each pixel.

Referring now to FIG. 3B, the disclosed image register embodiment of the present invention operates on consecutive pixels in parallel to accelerate overall image processing. After initial preset steps 74 and 76, the counter 36 and DFFs 40 and 42 are initialized (i.e., filling the so-called pipeline). Read and write operations are then performed during each clock period, in parallel, to thereby accelerate image data processing. For example, in step 78, a color code associated with address n is mixed and is written into one of the SRAMs 32 or 34 (dependent on whether n is even or odd). Simultaneously, in step 80, the color code associated with address n+1 is read and latched. The latched color code data from step 80 is then used in step 82. In parallel with step 82, the data (i.e., color code) associated with address n+2 is read and latched in step 84 for subsequent processing in step 86, and so on with steps 88, 90, 92, 94, 96, 98 and 100. It should be appreciated from FIGS. 3A, and 3B that once the pipeline is filled in step 74 and 76, the parallel processing architecture of the present invention permits color mixing of a pixel every cycle of the clock CLK. For example, in FIG. 3A, a prior art image register completely processes 3 pixels in the 7 clock periods shown. The image register 10 of the present invention, including a set-up clock cycle, completely processes 6 pixels in the 7 clock cycles shown in FIG. 3B.

Although the present invention has been described in an illustrative manner, it should be understood that the terminology used in intended to be in the nature of words of description, rather than of limitation.

Furthermore, while the present invention has been described in terms of a preferred embodiment thereof, it is to be appreciated that those skilled in the art will readily apply these teachings to other possible variations of the invention. For instance, other similar arrangements of the SRAM, the adder, and the counter can easily be substituted for those shown in the preferred embodiment, while substantially accomplishing the same desirable result. The embodiments of the invention in which an exclusive property or privilege are claimed are defined as follows:

I claim:

1. An image register for processing image data associated with a range of addresses including even addresses and odd addresses wherein said image data includes a color code portion, comprising:

a first memory means for storing said image data associated with said even addresses;

a second memory means for storing said image data associated with said odd addresses;

address means for addressing said first and second memory means in accordance with an even state and an odd state of said register; and, processing means coupled to said first and second memory means for simultaneously writing image data having a modified color code portion into said first memory means and reading stored image data from said second memory means during said even state, and for simultaneously reading stored image data from said first memory means and writing image data having said modified color code portion into said second memory means during said odd state, and for selectively summing, in response to a mix signal, said color code portion of input image data and said color code portion of stored image data to define said image data having said modified color code portion, whereby image data associated with consecutive even and odd addresses are operated on in parallel to thereby improve processing speed.

2. The register of claim 1, wherein said first memory means and said second memory means each comprise a static random access memory (SEAM) device.

3. The register of claim 1, wherein said first and second memory means are each selected from the group consisting of latch-type devices and D-flip-flop (DFF) type devices.

4. The register of claim 1, wherein said address means comprises a counter having a preset input for presetting said counter to a preselected initial value for addressing said second memory means, said address means further comprising adder means responsive to said counter output for addressing said first memory means.

5. The register of claim 4, wherein a least significant bit (LSB) of said counter is indicative of one of said even and odd states.

6. The register of claim 1, wherein said processing means comprises:

first and second control gates responsive to said address means for enabling said first and second memory means to be read from and written into;

first and second buffers for receiving and temporarily retaining stored image data respectively read from said first and second memory means;

first and second transmission gates responsive to said mix signal and respectively coupled to said first and second buffers for selectively passing said color code portion of said stored image data; and, first and second summing means for generating said image data having said modified color code each having a pair of inputs wherein one of said summing means inputs for said first and second summing means is responsive to said input image data and wherein the other one of said summing means inputs for said first and second summing means is respectively coupled to said first and second transmission gates.

7. An image register for processing image data associated with a range of addresses including even addresses and odd addresses wherein said image data includes a color code portion, comprising:

a first memory for storing image data associated with said even addresses;

a second memory for storing image data associated with said odd addresses;

a counter having a preset input for presetting said counter output to a preselected value, said counter output determining an address for said second memory, said least significant bit of said counter output being indicative of an even state and an odd state;

an adder responsive to said counter output for determining an address for said first memory;

first and second adders coupled to said first and second memory for summing said color code portion of input image data and said color code portion of stored image data to define image data having a modified color code portion; and, first and second control gates for simultaneously writing image data having said modified color code portion into said first memory and reading stored image data from said second memory during said even state, and for simultaneously reading stored image data from said first memory and writing image data having said modified color code portion into said second memory during said odd state, wherein image data associated with consecutive even and odd addresses are processed in parallel to thereby improve processing speed.

8. The register of claim 7 further comprising first and second transmission gates responsive to a mix signal and respectively coupled to said first and second memories for selectively passing, in response to said mix signal, said color code portion of said stored image data from said first and second memories, respectively, to said first and second adders.

9. The register of claim 8 further comprising first and second buffers each having outputs respectively coupled to said first and second transmission gates for receiving and temporarily retaining stored image data respectively read from said first and second memory.

10. The register of claim 9, wherein said first and second buffers each comprise a D-type flip-flop (DFF).

11. The register of claim 7, wherein said first and second memories each comprise a static random access memory (SRAM).

* * * * *